Figure 1:
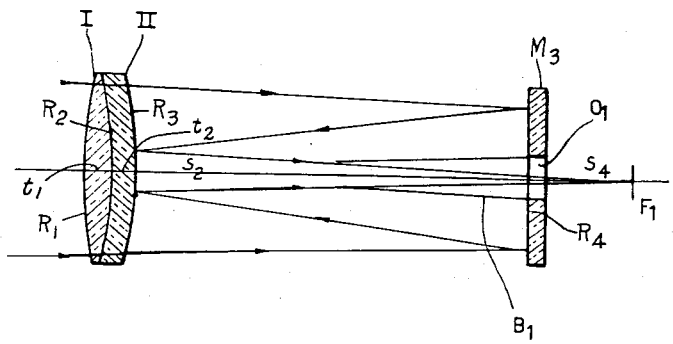

June 5, 1956  A. BOUWERS  2,748,658
TELE-OBJECTIVE OF THE CATADIOPTRIC TYPE
Filed Dec. 15, 1952

INVENTOR.
ALBERT BOUWERS
BY
Sanderoth, Lind & Ponack
Attorneys

United States Patent Office 2,748,658
Patented June 5, 1956

2,748,658

TELE-OBJECTIVE OF THE CATADIOPTRIC TYPE

Albert Bouwers, The Hague, Netherlands, assignor to N. V. Optische Industrie "De Oude Delft," Delft, Netherlands Application December 15, 1952, Serial No. 325,913

Claims priority, application Netherlands December 29, 1951

6 Claims. (Cl. 88—57)

The invention relates to a tele-objective.

It is a well-known method to realise in a tele-objective the required small overall length in comparison with the focal distance by combinng a positive lens system with a negative lens system placed at some distance from it. The disadvantage connected with this construction is that even in this way a rather great overall length is obtained.

Another well-known construction is that which the applicant has described in his U. S. Patent 2,504,383, in which a combination is applied of a concave and a convex mirror, together with a negative correction element which corrects the spherical aberration of the concave mirror. The correction element is in that case formed by a negative lens. In this case a divergence of the active light beams between the correction element and the concave mirror is the result, so that the latter must have a diameter larger than the diameter of the negative lens system.

The object of the invention is to obviate all these disadvantages.

The tele-objective according to the invention has a positive lens system as front element, whilst in the path of rays behind this front element a first and a second mirror are mounted successively, which mirrors are centered with respect to the front element, and is characterized in that the first mirror is situated at a distance from the front element, which amounts to at least one fifth of but at most half the focal distance of that element, whilst the second mirror is located near the front element, and that both the first and the second mirror are plane or slightly curved with a radius of curvature which is at least 8x as large as its diameter.

The tele-objective according to the invention has in the first place the great advantage that a very favorable relation between overall length and focal distance can be effected in a simple and efficacious way. The construction length can e. g. be restricted to only one third or one fourth of the focal distance.

In the second place a rather strong convergence of the light beams is effected by the positive front element, on account of which both the first mirror and its mounting can be considerably smaller than the front element. Also the accurate centering of the first mirror with respect to the front element and the second mirror is simplified by these small dimensions. In order to make these advantages as effective as possible it is according to the invention recommendable to make the power of the front element at least 50% of the power of the whole tele-objective. The mirrors can then have a small curvature, so that they contribute only little to the aberrations.

The invention can be realised in different ways, which each of them has their particular advantages.

In a first embodiment of the tele-objective according to the invention, the first mirror is provided with a central aperture and the focus of the tele-objective as a whole is located on that side of the first mirror which is turned from the lens system. In this way a rotationally symmetrical arrangement is achieved which is simple in construction.

It stands to reason, however, that in special cases, e. g. where the length of the tele-objective has of necessity to be as small as possible, a construction can be applied in which in the path of rays behind the second mirror, where the diameter of the active light beams is small, a small 45° mirror can be placed to bring the image in lateral direction out of the space between front element and first mirror.

In order to obtain a system with small obstruction ratio, which in this case is determined by the diameter of the second mirror in relation to the diameter of the front element, there is a favorable embodiment of the tele-objective according to the invention characterized by a concave first mirror. This has the result that the active beams reflected at this mirror have at the second mirror near the front element a smaller diameter than in case the first mirror would have been plane or convex, so that a smaller second mirror is sufficient.

Moreover, the application of the concave mirror brings about the advantage that the overall length can be even smaller in relation to the focal length of the tele-objective than in the case of a plane or convex first mirror. Finally, the application of the concave mirror has the advantage that this mirror, which is slightly curved, contributes to the power of the objective without introducing aberrations of importance.

It is according to the invention recommendable to make the second mirror convex. Thus a very short overall length is achieved in comparison with the focal distance.

A very advantageous embodiment is obtained, if according to the invention a concave first mirror is combined with a convex second mirror.

According to the invention it is also recommendable to make the lens system as a doublet. Thus an extremely simple system is obtained which nevertheless has a very great resolving power.

Finally, according to the invention, the second mirror can be placed on one of the lenses of the front element, either by cementing it on that element, or by providing the central zone of one of the surfaces of the front element with a reflective coating. The advantages thus obtained both for construction and production, are evident.

For a better understanding of the invention reference may be made to the accompanying drawings, in which Fig. 1 is a diagrammatic view of one form of the new tele-objective.

Figure 2:
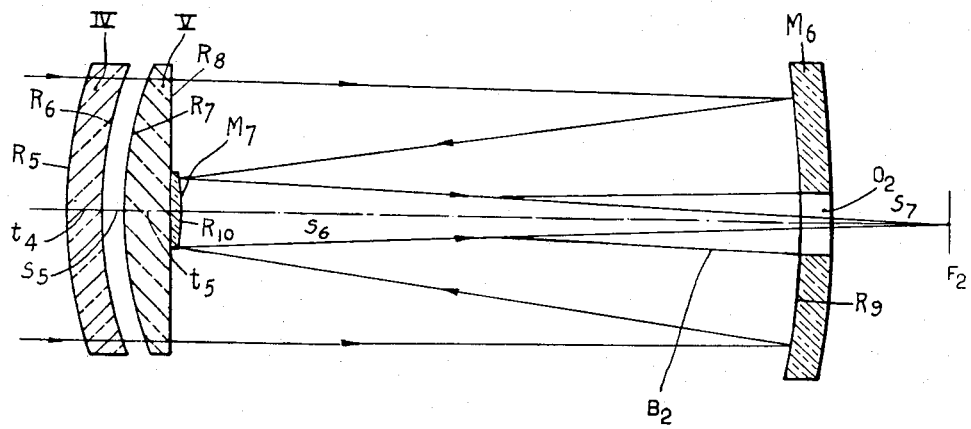

Fig. 2 is a diagrammatic view of a second form of the new tele-objective.

The following are examples of two forms of the tele-objective according to the perferred embodiment of the invention:

*Example I*

[f/7    f=1000 mm. overall length 320.]

| Lens | $N_D$ | V | Radii | Thickness |
|------|-------|-----|---------|-----------|
| I | 1.572 | 57.6 | $R_1=+472$ | $t_1=20$ |
|   |       |      | $R_2=-367$ | $d_1=140$ |
| II | 1.646 | 34.0 | $R_2=-367$ | $t_2=13.5$ |
|    |       |      | $R_3=-5950$ | $s_1=279$ |
| $M_1$ |   |      | $R_4=\infty$ | $d_2=140$ |
|       |   |      |              | $s_2=73$ |

The obstruction ratio amounts to 25%, measured linearly or 6.25% in area.

It consists of a positive front element, which is executed as a doublet with the component parts I and II, as well as a plane first mirror III, provided with a central aperture $O_1$. The focus $F_1$ is situated behind mirror III. The second mirror is convex and is obtained by providing the central zone of inner surface 3 of lens II with a reflective coating. In order to prevent that light rays after passing through the front element reach aperture $O_1$ without being reflected on the first and the second mirror, the tubular diaphragm $B_1$ is provided.

*Example II*

[f/13.3  f=2000 mm. overall length 380.]

| Lens | $N_D$ | V | Radii | Thickness |
|---|---|---|---|---|
| IV | 1.510 | 64.0 | $R_6=+501$<br>$R_6=+234$ | $t_4=20$<br>$s_5=9$<br>$d_4=150$ |
| V | 1.613 | 37.1 | $R_7=+238$<br>$R_8=+2000$ | $t_6=25$<br>$s_6=320$ |
| $M_6$<br>$M_7$ | | | $R_9=-3715$<br>$R_{10}=-446.7$ | $d_7=50$<br>$s_7=84$ |

The obstruction ratio, measured linearly, amounts to 30%, i. e. 9% measured in area.

Here the front element consists of component parts IV and V, the first mirror VI being concave and the second mirror VII convex. The latter is cemented on the inner surface 8 of component V of the front element. Here also the first mirror VI is provided with an aperture $O_2$ and the image plane of the tele-objective as a whole is located in $F_2$ behind mirror VI. The tubular diaphragm $B_2$ again serves to intercept parasitary rays.

I claim:

1. A tele-objective comprising a positive lens system as a front element, said system having a dioptric power amounting to at least 50% of the power of the tele-objective as a whole, a first mirror mounted in the path of the rays behind said front element at a distance from said front element which is at least one fifth of and at most half of the focal distance of said front element, a second mirror located near said front element, in the path of the rays reflected from said first mirror, both of said mirrors being located on the same axis as said front element and both of said mirrors being plane, and an image plane disposed to receive the rays reflected from said second mirror.

2. A tele-objective as claimed in claim 1 in which said first mirror has a concave reflecting surface with a radius of curvature of at least eight times the diameter of said mirror.

3. A tele-objective as claimed in claim 1 in which said second mirror has a convex reflecting surface with a radius of curvature at least eight times the diameter of said second mirror.

4. A tele-objective as claimed in claim 1 in which said first mirror has a concave reflecting surface with a radius of curvature at least eight times as large as the diameter of said first mirror, and said second mirror has a convex reflecting surface with a radius of curvature at least eight times the diameter of said second mirror.

5. A tele-objective having a focal distance of 1,000 mm. an an overall length of 320 mm., comprising a positive lens system as a front element having a diameter of 140 mm. and a thickness of 20 mm., said lens system comprised of a double convex lens, the surface first struck by the rays having a radius of curvature of 472 mm. and the other surface having a radius of curvature of 367 mm. and having a refraction index of 1.572 and an Abbe No. 57.6, a concavo-convex lens attached to the second surface of said double convex lens, the surface attached to the double convex lens having a radius of curvature of 367 mm. and the other surface having a radius of curvature of 5,950 mm. and having a refraction index of 1.646 and an Abbe No. 34.0, a first plane mirror mounted at a distance of 279 mm. from said positive lens system and in axial alignment therewith, and having a central aperture axially located therein, a second mirror located on the surface of said positive lens system facing said first mirror, positioned on the axis of said positive lens system and having a radius of curvature equal to the radius of curvature of said surface facing said first mirror, and an image plane located on the axis of said positive lens system at a distance of 73 mm. from the surface of said first mirror facing away from said positive lens system.

6. A tele-objective having a focal distance of 2,000 mm. and an overall length of 380 mm., comprising a positive lens system as a front element having a diameter of 150 mm., said lens system comprising a concavo-convex lens element the front surface of which has a radius of curvature of 501 mm. and the rear surface of which has a radius of curvature of 234 mm. and having a refractive index of 1.510 and an Abbe No. 64.0 and a thickness of 20 mm., and a double convex lens element the front surface of which has a radius of curvature of 238 mm. and the other surface of which has a radius of curvature of 2,000 mm. and having a refractive index of 1.613, an Abbe No. 37.1 and a thickness of 25 mm., said double convex lens being spaced from said concavo-convex lens a distance of 9 mm., a concave mirror spaced 320 mm. from said double convex lens element along the axis of said positive lens system and having an axially located aperture and the reflecting surface of which has a radius of curvature of 3,715 mm., a second mirror adjacent said double convex lens element at the surface of said lens element facing said first mirror, said second mirror having a convex reflecting surface with a radius of curvature of 446.7 mm. and a diameter of 50 mm., and an image plane spaced 84 mm. from the surface of said first mirror away from said positive lens element.

References Cited in the file of this patent

UNITED STATES PATENTS

| 2,141,884 | Sonnefeld | Dec. 27, 1938 |
| 2,350,112 | Houghton | May 30, 1944 |
| 2,504,383 | Bouwers et al. | Apr. 18, 1950 |
| 2,563,433 | Taylor | Aug. 7, 1951 |

FOREIGN PATENTS

| 969,797 | France | May 31, 1950 |
| 824,558 | Germany | Dec. 13, 1951 |